United States Patent [19]

Sherk et al.

[11] 3,897,303

[45] July 29, 1975

[54] INTEGRATED PROCESS OF AMMONIA PRODUCTION AND BIOSYNTHESIS

[75] Inventors: Fred T. Sherk; Donald O. Hitzman, both of Bartlesville, Okla.

[73] Assignee: Phillips Petroleum Company, Bartlesville, Okla.

[22] Filed: Jan. 23, 1974

[21] Appl. No.: 435,973

[52] U.S. Cl.................. 195/27; 195/28 R; 195/49; 423/352
[51] Int. Cl............................................. C12b 1/00
[58] Field of Search............. 195/28 R, 49, 50, 115, 195/27; 423/359–363, 352

[56] References Cited
UNITED STATES PATENTS
3,546,071  12/1970  Douros et al. ..................... 195/28 R OTHER PUBLICATIONS
Bailar et al. "Comprehensive Inorganic Chemistry–Nitrogen" Pergamon Press, 1972, pp. 200–207, QD151.2.C6.

*Primary Examiner*—A. Louis Monacell
*Assistant Examiner*—R. B. Penland
*Attorney, Agent, or Firm*—Neuman, Williams, Anderson & Olson

[57] ABSTRACT

An integrated process for the production of cellular protein material and ammonia. Methane is subjected to partial oxidation to produce methanol and formaldehyde which products are sent to a fermentor providing a source of carbon for fermentation which produces cellular protein. The residual gases from the partial oxidation constitute the feed to an ammonia synthesis operation and a part of the ammonia produced is used in the fermentation.

2 Claims, 1 Drawing Figure

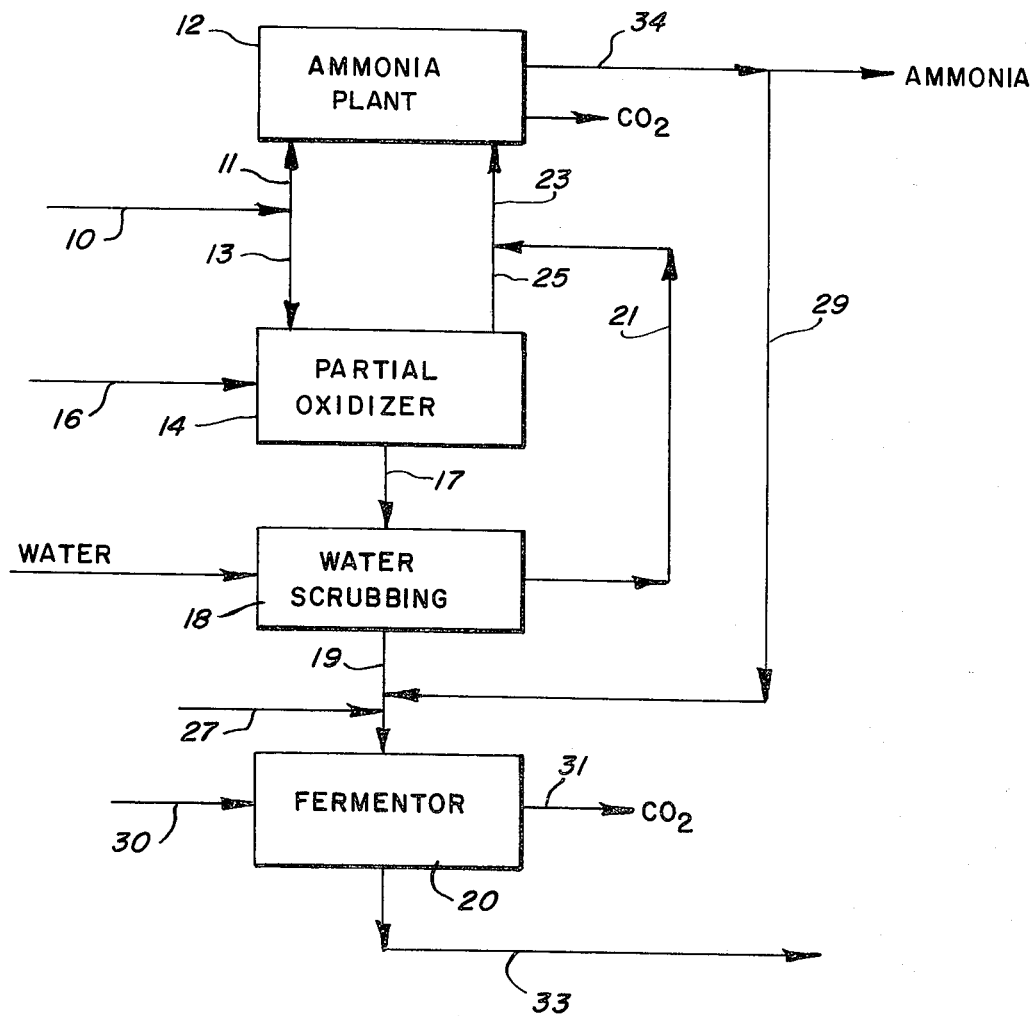

INTEGRATED PROCESS OF AMMONIA PRODUCTION AND BIOSYNTHESIS

This invention relates to a process for the production of cellular protein material in combination with the synthesis of ammonia.

The cultivation of single cell biomasses for human and animal consumption is a growing industry. Fermentation processes produce single cells which are rich in protein and vitamins so that they are used increasingly to supplement diets. Ammonia is an important industrial chemical with many uses, such as fertilizer, nitric acid production, etc.

It is a principal object of the present invention to provide a novel process for producing cellular protein material in conjunction with the operation of an ammonia plant.

The process of this invention is illustrated in the schematic process flow diagram of the drawing.

Referring to the drawing, air is passed through line 10 with a portion thereof being directed through line 13 into partial oxidizer 14 and the remainder being directed through line 11 into ammonia plant 12. The ratio of feed directed through line 11 and through line 13 is generally about 4:1 on a mole basis.

In a typical ammonia plant utilizing a synthesis gas feed stream, methane, air and steam are mixed and allowed to react, initially to form carbon monoxide, carbon dioxide and hydrogen and further, utilizing the steam water gas reaction, the carbon monoxide and steam react to form more hydrogen and carbon dioxide. A gas stream is formed which contains the nitrogen originally present in the air feed and hydrogen in the proper proportion to form ammonia, i.e., 3 moles hydrogen to 1 mole nitrogen. These are allowed to react at high temperature and pressure over a suitable catalyst such as metal oxide catalyst to form ammonia.

In the process of this invention, the methane feed stream is first introduced into the partial oxidizer 14 through line 16, admixed with air from stream 13 allocated from line 10 and is partially oxidized to methanol, formaldehyde, carbon monoxide and carbon dioxide; some hydrogen is also produced here. The gases, i.e., the residual methane, nitrogen, carbon monoxide, carbon dioxide and traces of hydrogen, constitute the feed stream to the ammonia plant after removal of the water soluble oxidation products in scrubber 18.

The partial oxidizer 14 can be operated over a range of temperatures and pressures. The temperature may vary from 400° to 450° C., preferably about 430° C., and the pressure may vary from 300 to 1,500 psia, preferably about 900 to 1,200 psia. The feed comprising fresh feed and optionally recycle gases from scrubber 18, contain methane, nitrogen, oxygen and traces of carbon monoxide, carbon dioxide and hydrogen. The mole ratio of methane to oxygen is in the range of 10 to 50:1, preferably about 20 to 30:1. At 430° C. approximately 51% of the methane oxidized is converted to methyl alcohol and approximately 4.1% to formaldehyde.

The effluent from partial oxidizer 14 is passed via line 17 to water scrubber 18. As a result of water scrubbing at 18, the methyl alcohol and formaldehyde are dissolved and the aqueous effluent is then passed via line 19 to fermentor 20. The undissolved gases from scrubber 18 consisting mainly of methane, nitrogen, carbon dioxide, carbon monoxide and a little hydrogen are sent via line 21 from which they can be diverted either through line 23 into ammonia plant 12 or through line 25 into oxidizer 14. The gas stream from 21 may be fed to the ammonia plant 12 in its entirety via line 23, or may be divided into a recycle stream via line 25 to the partial oxidizer and the ammonia plant feed stream via line 23 in some suitable ratio of recycle stream to feed stream up to about 4:1, preferably about 2:1.

In fermentor 20 the aqueous effluent from water scrubber 18 containing methanol and a minor amount of formaldehyde is subjected to microbial fermentation by methods known to the art. The microbial fermentation of water-soluble alcohols and aldehydes, and particularly methanol and formaldehyde, is disclosed in U.S. Pat. No. 3,642,578 issued Feb. 15, 1972, the disclosure of which by reference is incorporated herein. Among the microorganisms suitable for this type of fermentation are bacteria, yeasts and fungi exemplified in a non-limiting manner below:

Bacteria: Brevibacterium, Nocardia, Corynebacterium, Micrococcus, Arthobacter, Mycobacterium, Streptomyces, Pseudomonas, Bacillus, Actinomyces Yeasts: Candida, Saccharomyces, Torulopsis, Rhodotorula, Hansenula, Brettanomyces, Pichia, Debaryomyces Fungi: Aspergillus, Penicillium, Monilia, Fusarium, Rhizopus, Mucor, Alternaria, Fungi imperfecti A suitable liquid growth medium, growth factors, minerals, etc. as disclosed in the referenced patent, for example, are introduced through line 27. Inoculation of the fermentor with the desired microorganism may also be accomplished through line 27. Ammonia from ammonia plant 12 is introduced via line 29 and admixed with the aqueous solution of methanol and formaldehyde in line 19 prior to its introduction into fermentor 20. This provides the nitrogen required for the fermentation while air or oxygen for the fermentation is supplied through separate stream 30. Carbon dioxide produced in fermentor 20 is vented through line 31. The proteinaceous cellular material is removed via line 33 and can be subjected to usual recovery procedures such as coagulation/centrifugation or coagulation/filtration.

The following description illustrates a typical operation for an ammonia plant producing 1,000 tons per day and a fermentor producing 30,000 pounds per day of single cell protein:

Approximately 73,530 moles of air/day are introduced through line 10 with 58,305 moles thereof being passed through line 11 to ammonia plant 12 and 15,225 moles thereof being passed to partial oxidizer 14. The ammonia plant is operated conventionally to produce 1,000 tons per day of ammonia which is removed via line 34, except for the small amount required for the fermentation which is supplied to the fermentor via line 29. The feed stream to the ammonia plant consists of 51,500 moles of methane supplied through line 23 from the scrubber and 58,305 moles air/day supplied through line 11. In the reformer unit of the ammonia plant, the methane is converted to hydrogen and carbon dioxide (51,500 moles/day) and the residual nitrogen from the air stream supplies the other reactant for the ammonia converter. The ammonia converter operates conventionally at a pressure of about 3,000 psig, a temperature of 480° C., and uses an iron oxide catalyst.

The ammonia is removed through line 34, with 3.75 tons per day being diverted through line 29 to supply the fixed nitrogen requirement for the fermentor so that the plant produces 996.25 tons per day net of ammonia.

Through line 16, 55,930 moles of methane are introduced into partial oxidizer 14 which is operated at a temperature of 430° C. and a pressure of 1,000 psia. The effluent from oxidizer 14 is passed through line 17 and subjected to a water scrubbing operation in 18 at a temperature of 50° C. and a pressure of 1,000 psia. The undissolved gases, mainly nitrogen, methane, carbon dioxide and carbon monoxide, are removed via line 21. Approximately 51,500 moles per day of methane in this gas stream are sent via line 23 to ammonia plant 12 and the remaining mixture of gases is recycled via line 25 to partial oxidizer 14.

The aqueous effluent containing 2,260 moles of methanol and 183 moles of formaldehyde per day are passed through line 19 to fermentor 20. For fermentation of 30,000 pounds per day of cellular protein material approximately 3.75 tons of ammonia per day are passed through line 29 and admixed with the scrubber effluent in line 19. Approximately 4,539 moles of oxygen per day are added to fermentor 20 through line 30. A typical liquid nutrient medium consisting of an aqueous solution containing approximately 2.5 grams $KH_2PO_4$, 2.5 grams $K_2HPO_4$, 2.0 grams $(NH_4)_2SO_4$, 0.1 gram NaCl, 3.0 grams $MgSO_4 \cdot 7H_2O$, 0.04 gram $CaCl_2$ per liter plus 10 milliliters per liter of an aqueous trace mineral solution containing 0.06 gram $CuSO_4 \cdot 5H_2O$, 0.08 gram KI, 4.80 grams $FeCl_3 \cdot 6H_2O$, 0.30 gram $MnSO_4 \cdot H_2O$, 0.20 gram $Na_2MoO_4 \cdot 2 H_2O$, 2.00 grams $ZnSO_4 \cdot 7H_2O$ and 0.02 gram $H_2SO_4$ per liter is introduced through line 27 at a rate of about 1,600 gallons per hour. A single inoculation is made to the fermentor of a selected microorganism culture about 24 hours old. One of the preferred organisms is *Pseudomonas methanica* (Northern Utilization Research and Development Division identification NRRL B-3449). A volume of culture of about 5–10% of the volume of the fermentor is preferred.

It should be understood that either a single large fermentor or several serially connected smaller fermentors may be used.

After fermentation in fermentor 20, cellular protein material at a rate of 30,000 pounds per day is removed via line 33 with the cells being recovered by conventional methods such as centrifugation, flocculation and filtration, etc.

The advantage of the combined integrated process of this invention lies in the fact that the common feed stock, methane, can be used to provide the carbon source to the fermentation and the hydrogen to the ammonia plant. The air used to oxidize the methane will be stripped of its oxygen, normal for an ammonia plant, to provide the required nitrogen, but at least a part of this oxidation is utilized to produce the carbon source for the fermentation. Less than one-half of one percent of the ammonia per day is required to furnish the fixed nitrogen requirement for the fermentation, a hardly noticeable amount even though 30,000 pounds per day of cells are produced. The plant effluents are largely innocuous or can be recycled so that the process is also ecologically sound. Both products are valuable and contribute to the supply supplyo of the nation.

Those modifications and equivalents which fall within the spirit of the invention are to be considered a part thereof.

What is claimed is:

1. A process which comprises subjecting methane to partial oxidation in the presence of air, removing water-soluble products of said oxidation including methanol and formaldehyde, subjecting said water-soluble oxidation products to microbial fermentation, recovering a proteinaceous cellular product from said fermentation, passing non-water soluble gaseous products of said oxidation to an ammonia synthesis operation, and recycling at least a portion of ammonia from said synthesis operation to said microbial fermentation.

2. A process in accordance with claim 1 wherein at least a portion of the non-water soluble oxidation products are recycled to the oxidation step.

* * * * *

UNITED STATES PATENT OFFICE
CERTIFICATE OF CORRECTION

PATENT NO. : 3,897,303
DATED : July 29, 1975
INVENTOR(S) : FRED T. SHERK and DONALD O. HITZMAN It is certified that error appears in the above—identified patent and that said Letters Patent are hereby corrected as shown below:

Column 4, line 24, "supply supplyo" should read -- food supply --

Signed and Sealed this

*fourteenth* Day of *October 1975*

[SEAL]

Attest:

RUTH C. MASON
*Attesting Officer*

C. MARSHALL DANN
*Commissioner of Patents and Trademarks*